US010742621B2

(12) United States Patent
Lancioni et al.

(10) Patent No.: US 10,742,621 B2
(45) Date of Patent: *Aug. 11, 2020

(54) DEVICE PAIRING IN A LOCAL NETWORK

(71) Applicant: McAfee, LLC, Santa Clara, CA (US)

(72) Inventors: German Lancioni, San Jose, CA (US); Emiliano Gabriel Molina, Cordoba (AR); Patricio A. Maller, Cordoba (AR)

(73) Assignee: McAfee, LLC, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/204,365

(22) Filed: Nov. 29, 2018

(65) Prior Publication Data

US 2019/0141020 A1 May 9, 2019

Related U.S. Application Data

(63) Continuation of application No. 14/752,898, filed on Jun. 27, 2015, now Pat. No. 10,154,017.

(60) Provisional application No. 62/154,874, filed on Apr. 30, 2015.

(51) Int. Cl.
*H04L 29/06* (2006.01)
*H04W 12/08* (2009.01)
(Continued)

(52) U.S. Cl.
CPC .......... *H04L 63/0492* (2013.01); *G06F 21/44* (2013.01); *G06F 21/56* (2013.01);
(Continued)

(58) Field of Classification Search
CPC .......... G06F 13/14; G06F 21/44; G06F 21/56; H04L 63/04; H04L 63/0492; H04L 63/06;
(Continued)

(56) References Cited

U.S. PATENT DOCUMENTS 5,987,610 A 11/1999 Franczek et al.
6,073,142 A 6/2000 Geiger et al.
(Continued)

FOREIGN PATENT DOCUMENTS

RU 2305907 C2 9/2007
RU 114397 U1 3/2012
WO 20160175952 11/2016

OTHER PUBLICATIONS

"Bluetooth," Wikipedia, relevant section: "Pairing and Bonding," Apr. 26, 2015; 9 pages.

*Primary Examiner* — Michael Simitoski
(74) *Attorney, Agent, or Firm* — Patent Capital Group

(57) ABSTRACT

Particular embodiments described herein provide for an electronic device that can be configured to receive registration data for a local network device, receive registration data for an electronic device, receive a request to pair the local network device and the electronic device, where the request to pair the devices includes a pairing code, and allow the pairing if the registration data for the local network device, the registration data for the electronic device, and the pairing code satisfies predetermined conditions. In an example, the pairing code was to the local network device and the electronic device requested and received the pairing code from the local network device.

16 Claims, 9 Drawing Sheets

(51) Int. Cl.
  *H04W 12/06* (2009.01)
  *G06F 21/56* (2013.01)
  *G06F 21/44* (2013.01)
  *G06F 13/14* (2006.01)
  *H04W 88/08* (2009.01)
  *H04W 8/00* (2009.01)

(52) U.S. Cl.
  CPC ......... *H04L 63/0846* (2013.01); *H04W 12/06* (2013.01); *H04W 12/08* (2013.01); *G06F 13/14* (2013.01); *H04L 63/04* (2013.01); *H04L 63/06* (2013.01); *H04L 63/10* (2013.01); *H04L 63/104* (2013.01); *H04L 63/14* (2013.01); *H04W 8/005* (2013.01); *H04W 88/08* (2013.01)

(58) Field of Classification Search
  CPC ... H04L 63/0846; H04L 63/10; H04L 63/104; H04L 63/14; H04W 12/06; H04W 12/08; H04W 88/08; H04W 8/005
  See application file for complete search history.

(56) References Cited

U.S. PATENT DOCUMENTS

| | | |
|---|---|---|
| 6,460,050 B1 | 10/2002 | Pace et al. |
| 7,181,620 B1 | 2/2007 | Hur |
| 7,506,155 B1 | 3/2009 | Stewart et al. |
| 7,539,309 B2 | 5/2009 | Stadelmann et al. |
| 10,419,424 B2 * | 9/2019 | Pang ..................... H04W 76/10 |
| 2005/0130627 A1 | 6/2005 | Calmels et al. |
| 2009/0064283 A1 | 3/2009 | Chen |
| 2009/0282467 A1 | 11/2009 | Schenk |
| 2010/0138660 A1 | 6/2010 | Haynes et al. |
| 2010/0211685 A1 | 8/2010 | McDowall et al. |
| 2011/0296501 A1 | 12/2011 | Drovdahl et al. |
| 2012/0117636 A1 | 5/2012 | Adams |
| 2012/0322384 A1 | 12/2012 | Zerr et al. |
| 2012/0324076 A1 * | 12/2012 | Zerr ....................... H04W 4/21 709/223 |
| 2013/0185400 A1 | 7/2013 | Larson et al. |
| 2013/0227286 A1 | 8/2013 | Brisson |
| 2013/0312072 A1 | 11/2013 | Roermund et al. |
| 2014/0302816 A1 | 10/2014 | Yu |
| 2015/0067536 A1 | 3/2015 | Leorin et al. |
| 2015/0072653 A1 | 3/2015 | Fan et al. |
| 2015/0078283 A1 * | 3/2015 | Nakamura, Jr. ...... H04W 76/14 370/329 |
| 2015/0097689 A1 | 4/2015 | Logue et al. |
| 2015/0215778 A1 * | 7/2015 | Chin .................... H04W 8/005 455/411 |
| 2015/0382436 A1 | 12/2015 | Kelly et al. |
| 2016/0087933 A1 | 3/2016 | Johnson et al. |
| 2016/0112262 A1 | 4/2016 | Johnson et al. |
| 2017/0250974 A1 * | 8/2017 | Antonyraj ............. H04W 12/04 |
| 2018/0145844 A1 * | 5/2018 | Pera .................. H04M 1/72533 |
| 2018/0270276 A9 * | 9/2018 | Logue ................ H04L 12/2818 |

\* cited by examiner

DEVICE PAIRING IN A LOCAL NETWORK

CROSS-REFERENCE TO RELATED APPLICATIONS

This Application is a continuation (and claims the benefit of priority under 35 U.S.C. § 120) of U.S. application Ser. No. 14/752,898, filed Jun. 27, 2015, entitled "DEVICE PAIRING IN A LOCAL NETWORK," Inventors German Lancioni, et al., which claims the benefit of priority under 35 U.S.C. § 119(e) to U.S. Provisional Application No. 62/154,874, entitled "DEVICE PAIRING IN A LOCAL NETWORK" filed in the U.S. Patent Office on Apr. 30, 2015. The disclosures of the prior applications are considered part of (and are incorporated in their entirety by reference in) the disclosure of this application.

TECHNICAL FIELD

This disclosure relates in general to the field of information security, and more particularly, to device pairing in a local network.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. In addition, a malicious operator that gains access to a system may be able to steal sensitive information or perform any number of other malicious actions. Hence, significant administrative challenges remain for protecting computers and computer networks from malicious and inadvertent exploitation by malicious software or malicious operators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

The following detailed description sets forth example embodiments of apparatuses, methods, and systems relating to a communication system for device pairing in a local network. Features such as structure(s), function(s), and/or characteristic(s), for example, are described with reference to one embodiment as a matter of convenience; various embodiments may be implemented with any suitable one or more of the described features.

Figure 1A:
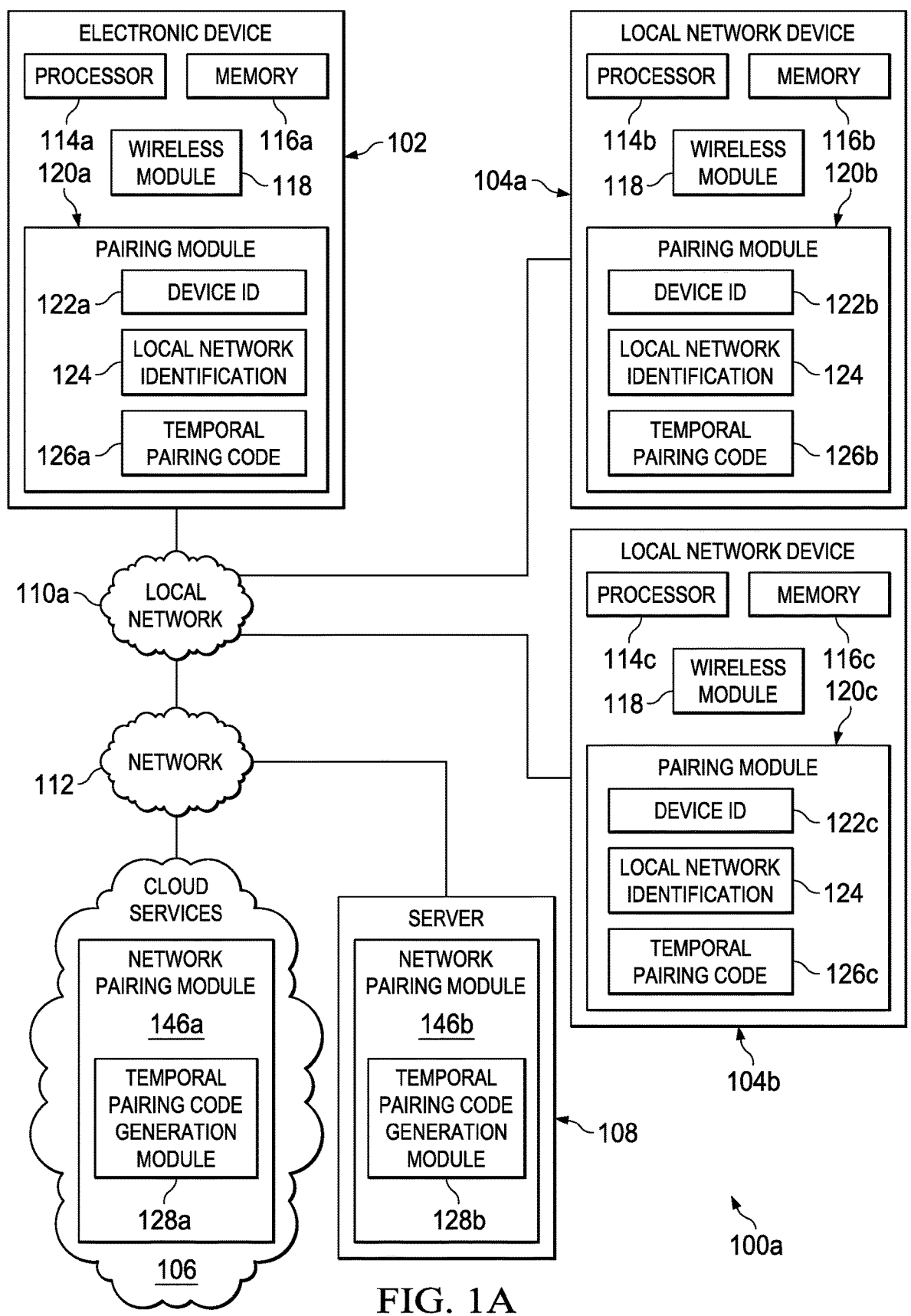
FIG. 1A is a simplified block diagram of a communication system for device pairing in a local network in accordance with an embodiment of the present disclosure.

FIG. 1A is a simplified block diagram of a communication system 100a for device pairing in a local network in accordance with an embodiment of the present disclosure. Communication system 100a can include an electronic device 102, one or more local network devices 104a and 104b, cloud services 106, and a server 108. Electronic device 102 and one or more local network devices 104a and 104b can communicate with each other using local network 110a. Electronic device 102, local network devices 104a and 104b cloud services 106, server 108, and local network 110a can communicate with each other using network 112.

Electronic device 102 can include a processor 114a, memory 116a, a wireless module 118, and a pairing module 120a. Pairing module 120a can include a device identification (ID) 122a, a local network ID 124, and a temporal pairing code 126a. Local network device 104a can include a processor 114b, memory 116b, wireless module 118, and pairing module 120b. Pairing module 120b can include a device ID 122b, local network ID 124, and a temporal pairing code 126b. Local network device 104b can include a processor 114c, memory 116c, wireless module 118, and pairing module 120c. Pairing module 120c can include a device ID 122c, local network ID 124, and a temporal pairing code 126c. Cloud services can include a network pairing module 146a. Network pairing module 146a can include a temporal pairing code generation module 128a. Server 108 can include a network pairing module 146b. Network pairing module 146b can include a temporal pairing code generation module 128b.

Figure 1B:
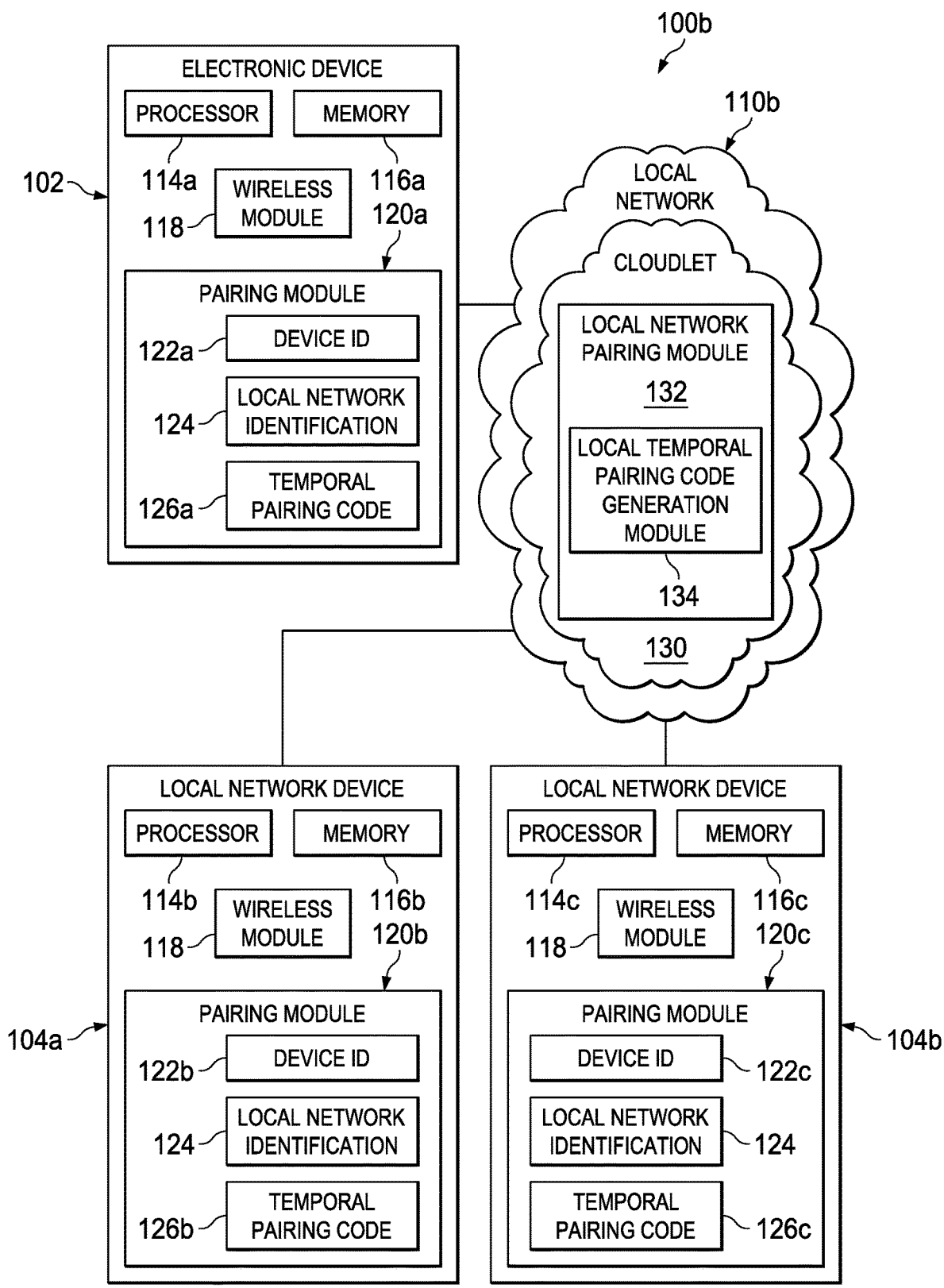
FIG. 1B is a simplified block diagram of a communication system for device pairing in a local network in accordance with an embodiment of the present disclosure.

Turning to FIG. 1B, FIG. 1B is a simplified block diagram of a communication system 100b for device pairing in a local network in accordance with an embodiment of the present disclosure. Communication system 100b can include local network 110b. Local network 110b can include cloudlet 130. Cloudlet 130 can include local network pairing module 132. Local network pairing module 132 can include local temporal pairing code generation module 134.

Elements of FIGS. 1A and 1B may be coupled to one another through one or more interfaces employing any suitable connections (wired or wireless), which provide viable pathways for network (e.g., local networks 110a and 110b and network 112) communications. Additionally, any one or more of these elements of FIGS. 1A and 1B may be combined or removed from the architecture based on particular configuration needs. Communication system 100a may include a configuration capable of transmission control protocol/Internet protocol (TCP/IP) communications for the transmission or reception of packets in a network. Communication system 100a and 100b may also operate in conjunction with a user datagram protocol/IP (UDP/IP) or any other suitable protocol where appropriate and based on particular needs.

In an example, communication system 100a and 100b can be configured to include a system that allows for device pairing in a local network. In an illustrative example, initially, temporal pairing codes 126a-126c are not on or known to electronic device 102 or local network devices 104a and 104b. Also, once obtained from cloud services 106 or server 108 in the case of communication system 100a and from local temporal pairing code generation module 134 in the case of communication system 100b, temporal pairing codes 126a-126c are not persistently stored in electronic device 102 or local network devices 104a and 104b. When a user wants to pair electronic device 102 and local network devices 104a or 104b, temporal pairing codes 126a-126c can be obtained from cloud services 106 or server 108 in the case of communication system 100a and from local temporal pairing code generation module 134 in the case of communication system 100b, and used to securely pair electronic device 102 and local network devices 104a or 104b. In an embodiment, any number of secondary devices may be used, with each secondary device obtaining their own unique temporal pairing code. Each temporal pairing code (e.g., temporal pairing code 126a-126c) can change every time electronic device 102 or local network device 104a or 104b moves to a different network (e.g. moving from a home Wi-Fi network to a work Wi-Fi network). When electronic device 102 or local network device 104a or 104b moves to a different network, a re-registration (e.g., with cloud services 106) is made. Cloud services 106 and server 108 can be configured to not only include network pairing module 146a but also a map between registered devices, assigned temporal pairing codes, and network identifications and uses the information and data to determine if devices should be pair or linked.

For purposes of illustrating certain example techniques of communication system 100a and 100b, it is important to understand the communications that may be traversing the network environment. The following foundational information may be viewed as a basis from which the present disclosure may be properly explained.

End users have more communications choices than ever before. A number of prominent technological trends are currently afoot (e.g., more computing devices, more connected devices, etc.). One current trend is commonly known as the Internet of Things (IoT). Generally, IoT is a network of physical objects or "things" embedded with electronics, software, sensors, and connectivity to enable each device to achieve greater value and service by exchanging data with the manufacturer, operator, and/or other connected devices. Each IoT or network device is uniquely identifiable through its embedded computing system but is able to interoperate within the existing Internet infrastructure and a network.

The growing demand for IoT devices for home and industrial applications is also incrementing the need to connect these with remote devices to monitor and command them (through dashboards or controller applications). For example, an owner's smartphone needs to be connected to a home surveillance camera in order to get access to a home surveillance camera video stream. Currently, the discovery and connection (understood as gaining access) between the IoT device and the smartphone is not simple nor secure. For example, a typical scenario to connect a IoT device can include activating the device, locating the device's IP address, navigating to the IP address, and logging on with a factory default username and password. Current known solutions are simply based on access control through username and password, which are pre-configured by manufacturers before shipping. The user is in charge of figuring out the IP address of the IoT device and entering the default credentials in order to get access to the IoT device. Alternative solutions are typically based on a Bluetooth® connection, in which the user must discover IoT devices and enter a PIN (again, a default one provided by the manufacturer) to pair the devices. These methods present security risks because of the pre-configured account (e.g. user=admin and password-=admin) and a large portions of the users do not change the account username and password after first login. In addition, these methods are often complicated for home users, which may not have the technical background to install and configure the IoT device. Unfortunately, this can cause several problems as the loT device is fully operational when activated and anybody can access the IoT device and there is typically not an exclusive relationship between one device and any other device. These issues and other allow for a sometimes difficult and unsecured pairing of IoT devices in a local network.

There are alternative solutions which do not cover the discovery of devices but just the pairing. This kind of solutions are based on user accounts and cloud services to match the devices. However, the user must create an account and login on both devices (e.g. smartphone and IoT device) to later create the relationship between two. This kind of solution is not suitable for IoT devices since IoT devices are usually displayless or have limited input. Therefore, configuring a user account is not always possible. In addition, cloud services typically require the user to create a particular user account for each vendor and the user may not remember every account password, or even worse, will use the same password for all the accounts and security will be considerably impacted.

A communication system for device pairing in a local network, as outlined in FIGS. 1A and 1B, can resolve these issues (and others). In communication system 100a and 100b, to pair devices in a local network, the system can be configured to find and establish a secure link between a consumer/commander device (e.g. smartphone) and an IoT device (provider/actuator device) by the inclusion of a variation of a network service discovery protocol hardened by the usage of a cloud security checkpoint. Communication system 100a can include a cloud service which acts as a security checkpoint and a variation of a network service discovery protocol that includes encryption during the data exposure step and a set of contextual rules and verifications that must be met by the involved devices. Communication system 100b can include a cloudlet in a local network that acts as the security checkpoint. In an example, communication systems 100*a* and 100*b* can be compliant with the essential definition of an IoT device by being based on a Wi-Fi infrastructure that is already in place. In addition, communication systems 100*a* and 100*b* can be configured to not require extra hardware such as Bluetooth® or NFC®, not require expert user interaction with the IoT device during the discovery and linking process, be conceived to operate alone or as an extra layer on top of preexisting solutions (e.g. besides the factory generic credentials), and provide security from the beginning and reduce the chances of unauthorized access to the IoT device.

One implementation of communication systems 100*a* and 100*b* can be suitable for smart home applications, since it provides the necessary mechanism to securely link IoT home appliances with controller devices such as smartphones and tablets, all coexisting in the same local environment and delimited by the home Wi-Fi network. Communication system 100*a* and 100*b* can also be suitable for industry purposes, providing a convenient and secure way for technicians to discover and link with IoT devices at factories. Communication system 100*a* and 100*b* can be configured such that there are no security gaps at the time window between the IoT device installation and the user's first access. Non-authorized access to IoT devices can be avoided when the user forgot to change the default factory login credentials (e.g. admin/admin).

Turning to the infrastructure of FIGS. 1A and 1B, communication systems 100*a* and 100*b* in accordance with an example embodiment is shown. Generally, communication systems 100*a* and 100*b* can be implemented in any type or topology of networks. Local network 110*a* and 110*b* and network 112 represent a series of points or nodes of interconnected communication paths for receiving and transmitting packets of information that propagate through communication systems 100*a* and 100*b*. Local networks 110*a* and 110*b* and network 112 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication systems 100*a* and 100*b*, network traffic, which is inclusive of packets, frames, signals (analog, digital or any combination of the two), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications (e.g., over a cellular network) may also be provided in communication systems 100*a* and 100*b*. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic device 102, local network devices 104*a* and 104*b*, cloud services 106, and server 108 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication systems 100*a* and 100*b*, each of electronic device 102, local network devices 104*a* and 104*b*, cloud services 106, and server 108 can include memory elements for storing information to be used in the operations outlined herein. Each of electronic device 102, local network devices 104*a* and 104*b*, cloud services 106, and server 108 may keep information in any suitable memory element (e.g., random access memory (RAM), read-only memory (ROM), erasable programmable ROM (EPROM), electrically erasable programmable ROM (EEPROM), application specific integrated circuit (ASIC), non-volatile memory (NVRAM), magnetic storage, magneto-optical storage, flash storage (SSD), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication systems 100*a* and 100*b* could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication systems 100*a* and 100*b*, such as electronic device 102, local network devices 104*a* and 104*b*, cloud services 106, and server 108 may include software modules (e.g., pairing modules 120*a*-120*c*, network pairing modules 146*a* and 146*b*, local network pairing module 132, local temporal pairing code generation module 134, etc.) to achieve, or to foster, operations as outlined herein. These modules may be suitably combined in any appropriate manner, which may be based on particular configuration and/or provisioning needs. In some embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic device 102, local network devices 104a and 104b, cloud services 106, and server 108 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic device 102 can be a network element and includes, for example, desktop computers, laptop computers, mobile devices, personal digital assistants, smartphones, tablets, wearables, or other similar devices. Local network devices 104a and 104b can be a network element and includes, for example, laptop computers, mobile devices, personal digital assistants, smartphones, tablets, wearables, IoTs, or other similar devices. Cloud services 106 is configured to provide cloud services to electronic device 102 and local network devices 104a and 104b. Cloud services may generally be defined as the use of computing resources that are delivered as a service over a network, such as the Internet. The services may be distributed and separated to provide required support for electronic device 102, local network devices 104a and 104b, and cloud services 106. Typically, compute, storage, and network resources are offered in a cloud infrastructure, effectively shifting the workload from a local network to the cloud network. Server 108 can be a network element such as a server or virtual server and can be associated with clients, customers, endpoints, or end users wishing to initiate a communication in communication system 100a via some network (e.g., network 112). The term 'server' is inclusive of devices used to serve the requests of clients and/or perform some computational task on behalf of clients within communication systems 100a. Although network pairing modules 146a and 146b are represented in FIG. 1 as being located in cloud services 106 and server 108 respectively, this is for illustrative purposes only. Network pairing modules 146a and 146b could be combined or separated in any suitable configuration. Furthermore, network pairing modules 146a and 146b could be integrated with or distributed in another network accessible by electronic device 102 and local network devices 104a and 104b.

Figure 2:
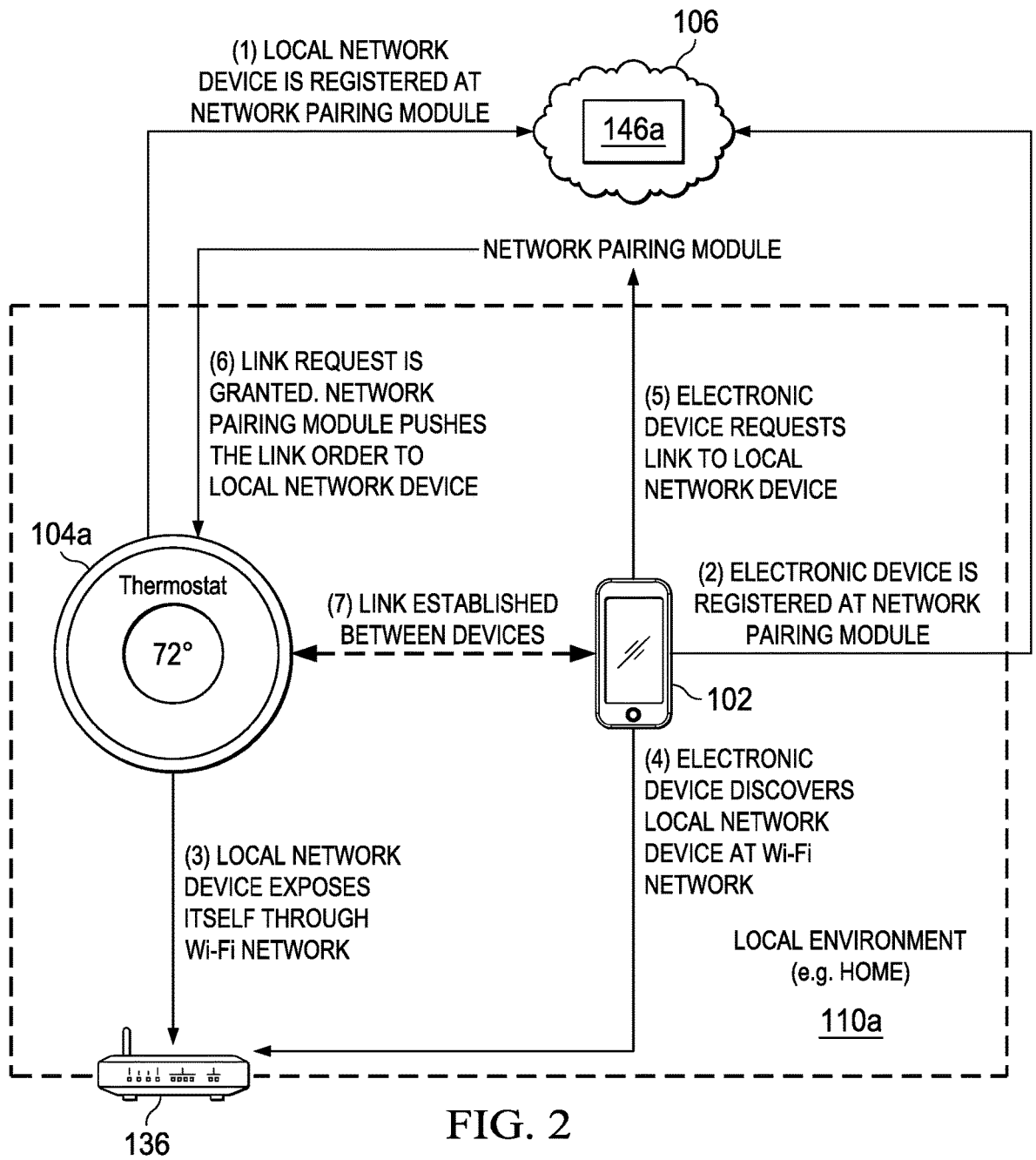
FIG. 2 is a simplified block diagram of a communication system for device pairing in a local network in accordance with an embodiment of the present disclosure.

Turning to FIG. 2, FIG. 2 is a simplified block diagram of a portion of communication system 100a for device pairing in a local network in accordance with an embodiment of the present disclosure. As illustrated in FIG. 2, electronic device 102 may be a smartphone and local network device 104a may be a smart thermostat. A router 136 can create local network 110a to provide a communication link between electronic device 102 and local network device 104a. Router 136 may be a Wi-Fi router in communication with cloud services 106 through network 112 (not shown)

At first, both electronic device 102 and local network device 104a are temporarily registered with cloud services 106 using their own device ID and the Wi-Fi SSID/BSSID of router 136 as registration scope. In an example, the BSSID is unique on each access point of the network. The BSSID can be used by network pairing module 146a to verify if the devices involved in the pairing are present in the same local network at the same time. If for any reason, a device changes from one Wi-Fi SSID to another, the registration is invalidated and devices would need to be paired again.

After registration, local network device 104a can request a temporal pairing code (TPC) from cloud services 106. This code has a short time-to-live (e.g., 5 minutes). With this TPC, local network device 104a can expose itself through domain name system (DNS) service discovery or a multicast DNS. The payload of the package in the DNS can include an encrypted TPC (using a variation of the NSD protocol supporting encryption).

Electronic device 102 can start the discovery of local network device 104a through DNS service discovery. Once local network device 104a is found, the TPC is extracted from the package's payload. To establish the link with local network device 104a, electronic device 102 executes a request to cloud services 106 by sending the TPC. Cloud services 106 can verify that the TPC is valid and belongs to previously registered local network device 104a and that both devices are under the same scope (e.g., under the same SSID and time frame). If conditions are satisfied for pairing, cloud services 106 can authorize a link between the devices. If a link is authorized, cloud services 106 can push a link order to local network device 104a, stating that from now on, local network device 104a will be commanded by electronic device 102 and local network device 104a will only respond to or allow operations related to linked electronic device 102.

Figure 3:
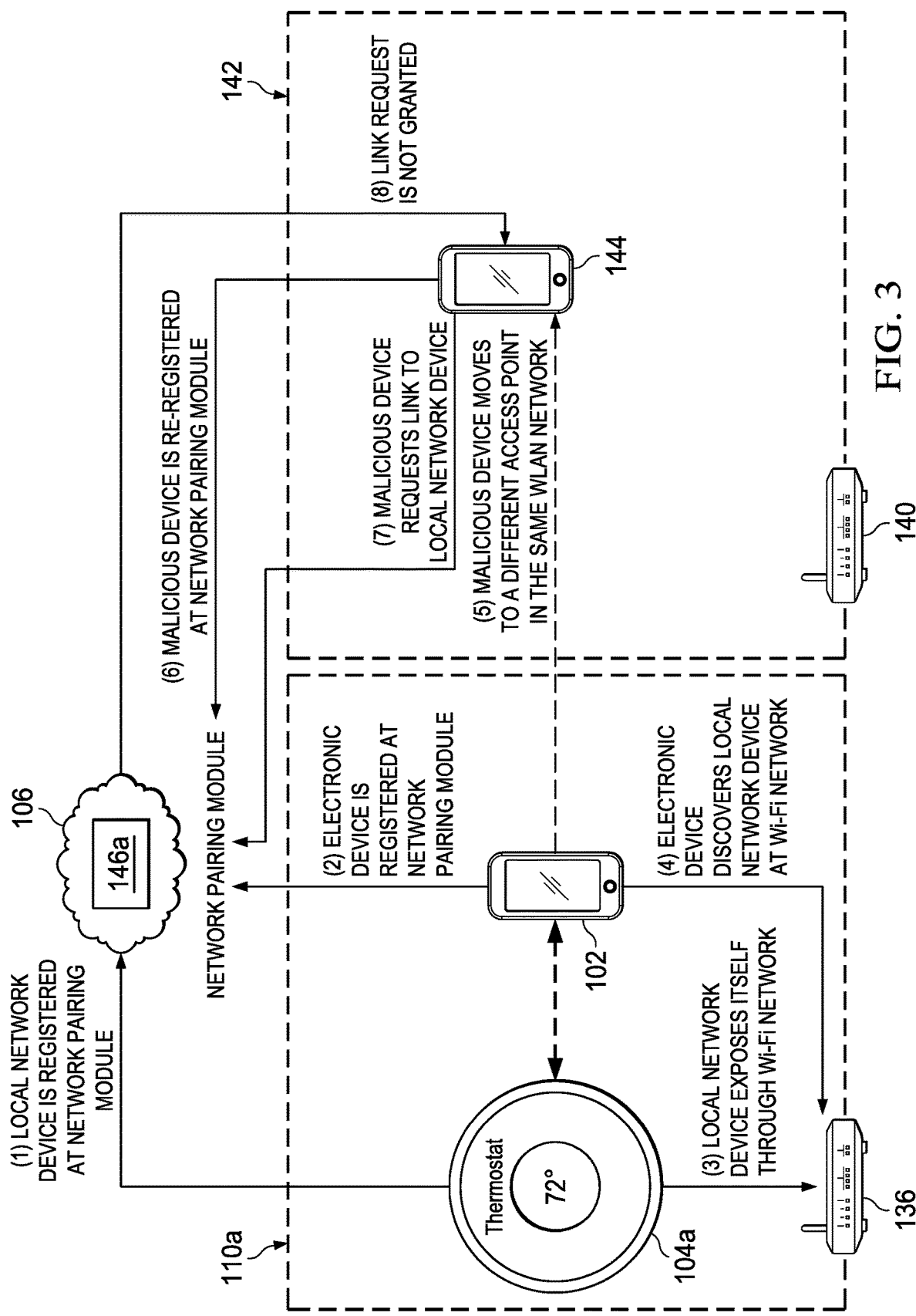
FIG. 3 is a simplified block diagram of a communication system for device pairing in a local network in accordance with an embodiment of the present disclosure.

Turning to FIG. 3, FIG. 3 is a simplified block diagram of a portion of communication system 100a for device pairing in a local network in accordance with an embodiment of the present disclosure. As illustrated in FIG. 3, a malicious device 144 can be prevented from pairing with local network device 104a. At first, both local network device 104a and malicious device 144 are temporarily registered with cloud services 106 using their own device ID. Local network device 104a can included the Wi-Fi SSID/BSSID of router 136 as its registration scope and malicious device 144 can include the Wi-Fi SSID/BSSID of second router 140 as its registration scope. In this example, because the Wi-Fi SSID for local network device 104a is different than the Wi-Fi SSID for malicious device 144, the pairing of the two devices will not be allowed. In addition, if electronic device 102 moves from local network 110a to another local network 142 and tries to link with local network device 104a which is still located in local network 110a, then the link will be denied by network pairing module 146a in cloud services 106, because the scope of electronic device 102 does not match with the scope of local network device 104a. The scope in this example is the local network identification (e.g. Wi-Fi unique BSSID and the temporal pairing code which must not be expired at the time the link is requested)

Figure 4:
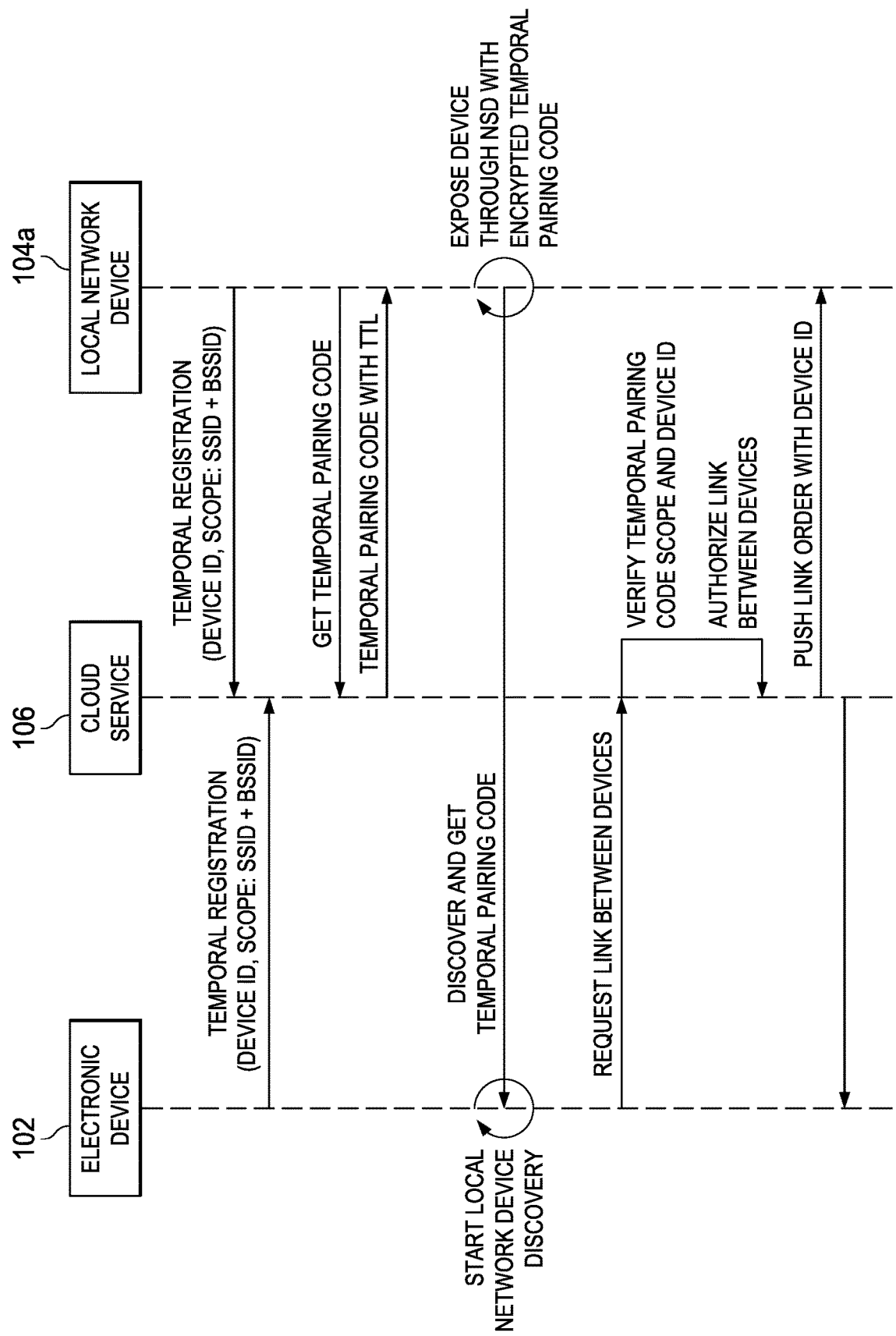
FIG. 4 is a simplified timing flow diagram illustrating potential operations that may be associated with the communication system in accordance with an embodiment.

Turning to FIG. 4, FIG. 4 is an example timing flow diagram illustrating possible operations that may be associated with device pairing in a local network, in accordance with an embodiment. In an embodiment, electronic device 102 and local network device 104a communicate a temporal registration to cloud services 106. Local network device 104a can communicate a request for a temporal pairing code from cloud services 106 and cloud services 106 can send a temporal pairing code to local network device 104a. Electronic device 102 can start local network discovery (e.g., through NSD) and local network device 104a can expose itself to the network using an encrypted temporal pairing code through NSD. Electronic device 102 can discover and acquire the temporal pairing code from local network device 104a and send a request for a link between the devices to cloud services 106. Cloud services 106 can verify the temporal pairing code scope and if the temporal pairing code scope is valid, then cloud services 106 can authorize a link between electronic device 102 and local network device 104a. Cloud services 106 can communicate a link order to electronic device 102 and local network device 104a.

Figure 5:
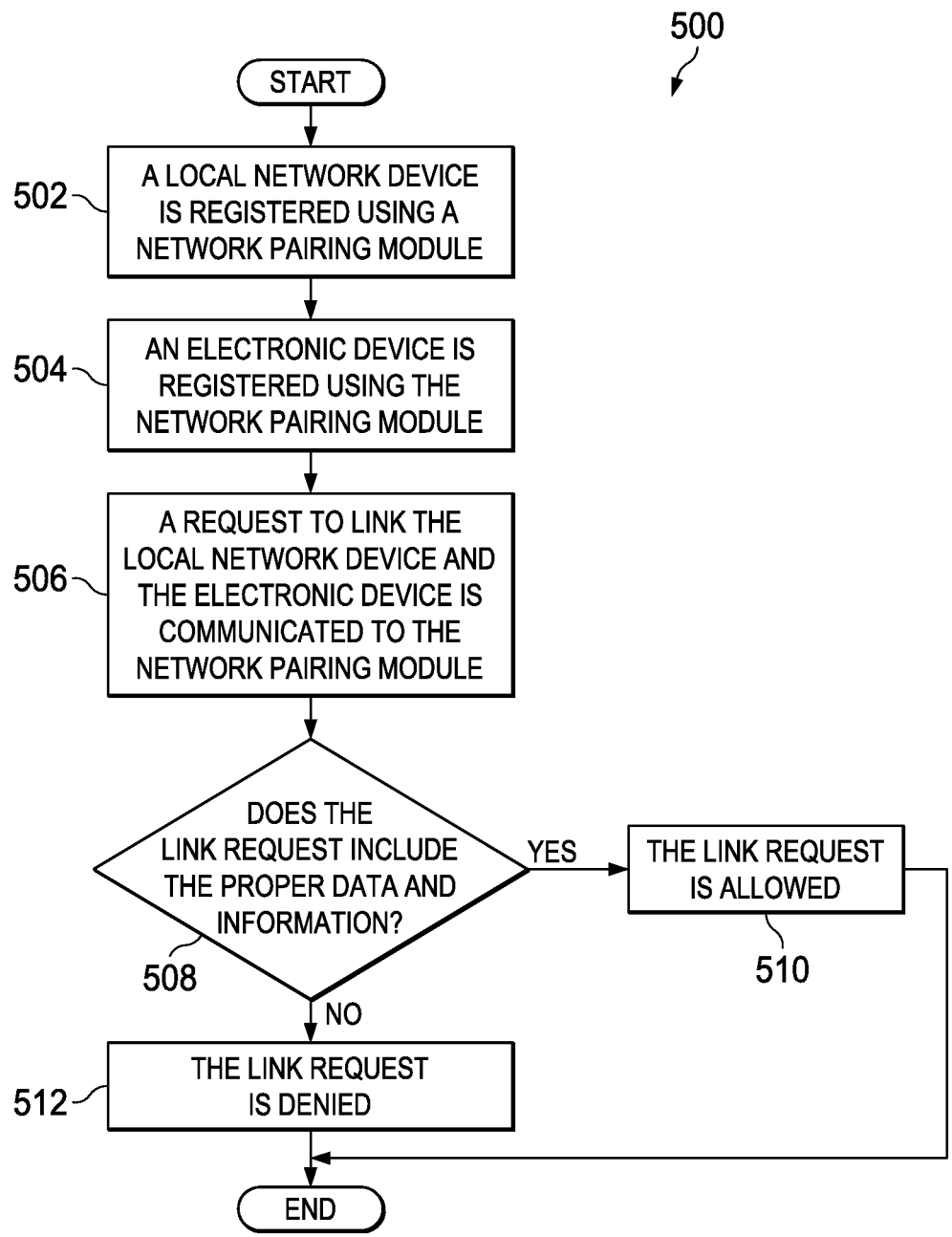
FIG. 5 is a simplified flowchart illustrating potential operations that may be associated with the communication system in accordance with an embodiment.

Turning to FIG. 5, FIG. 5 is an example flowchart illustrating possible operations of a flow 500 that may be associated with device pairing in a local network, in accordance with an embodiment. In an embodiment, one or more operations of flow 500 may be performed by one or more of pairing modules 120a-120c, network pairing modules 146a and 146b, and local network pairing module 132. At 502, a local network device is registered using a network pairing module. At 504, an electronic device is registered using the network pairing module. At 506, a request to link the local network device and the electronic device is communicated to the network pairing module. At 508, the system determines if the link request includes the proper data and information. For example, the link request should include the proper temporal pairing codes and Wi-Fi SSID. In an example, the temporal pairing code can change every time the electronic device or the local network device moves to a different network (e.g. moving from a home Wi-Fi network to a work or public Wi-Fi network). When a device moves to a different network, a re-registration (e.g., with cloud services 106) must be made. Cloud services 106 and server 108 can include a map between registered devices, assigned temporal pairing codes, and network identifications and use the information and data to determine if the devices should be paired or linked. If the system determines that the link request does include the proper data and information, then the link request is allowed, as in 510. If the system determines that the link request does not include the proper data and information, then the link request is not allowed, as in 512.

Figure 6:
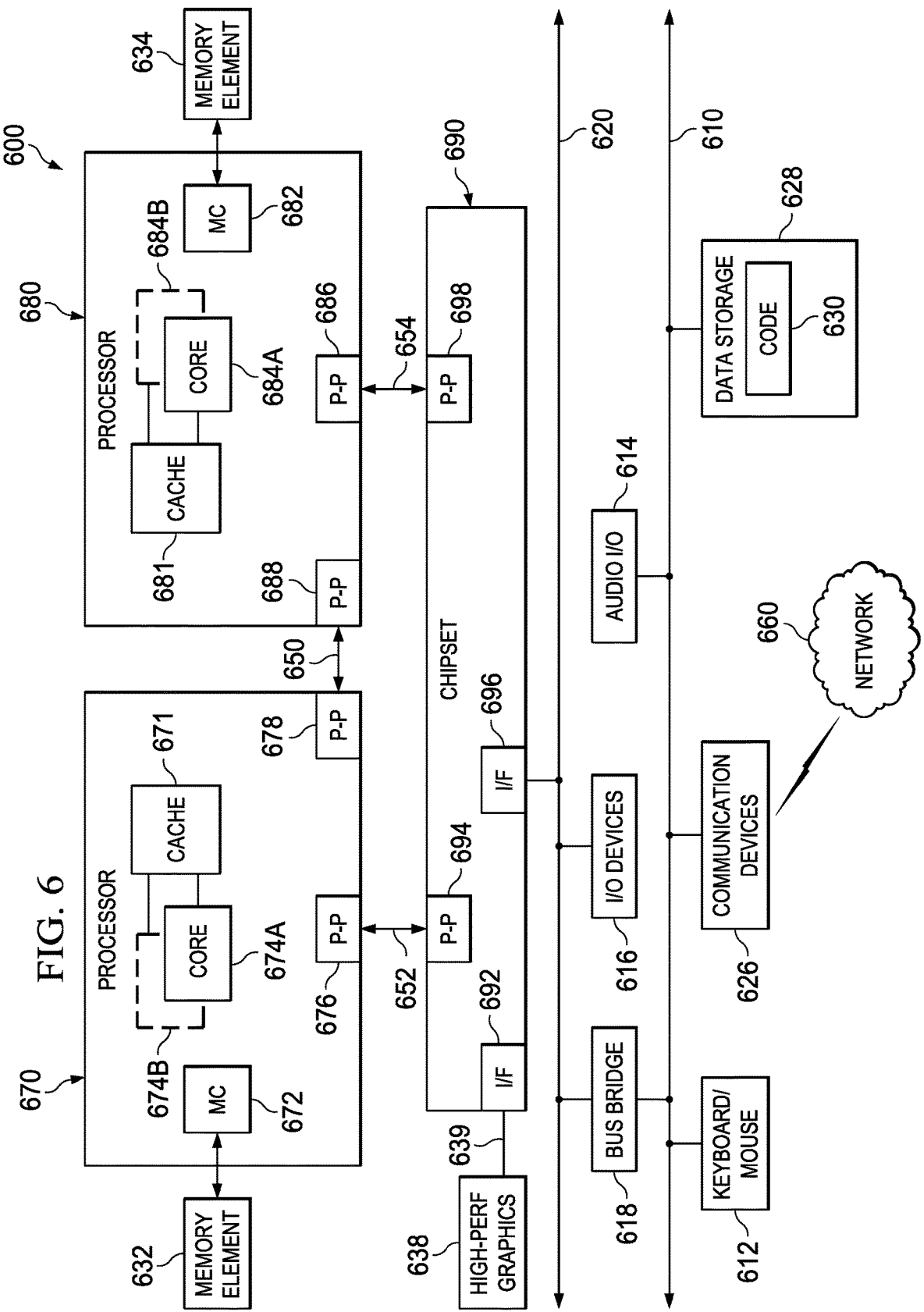
FIG. 6 is a block diagram illustrating an example computing system that is arranged in a point-to-point configuration in accordance with an embodiment.

Turning to FIG. 6, FIG. 6 illustrates a computing system 600 that is arranged in a point-to-point (PtP) configuration according to an embodiment. In particular, FIG. 6 shows a system where processors, memory, and input/output devices are interconnected by a number of point-to-point interfaces. Generally, one or more of the network elements of communication system 100 may be configured in the same or similar manner as computing system 600.

As illustrated in FIG. 6, system 600 may include several processors, of which only two, processors 670 and 680, are shown for clarity. While two processors 670 and 680 are shown, it is to be understood that an embodiment of system 600 may also include only one such processor. Processors 670 and 680 may each include a set of cores (i.e., processor cores 674A and 674B and processor cores 684A and 684B) to execute multiple threads of a program. The cores may be configured to execute instruction code in a manner similar to that discussed above with reference to FIGS. 1-5. Each processor 670, 680 may include at least one shared cache 671, 681. Shared caches 671, 681 may store data (e.g., instructions) that are utilized by one or more components of processors 670, 680, such as processor cores 674 and 684.

Processors 670 and 680 may also each include integrated memory controller logic (MC) 672 and 682 to communicate with memory elements 632 and 634. Memory elements 632 and/or 634 may store various data used by processors 670 and 680. In alternative embodiments, memory controller logic 672 and 682 may be discrete logic separate from processors 670 and 680.

Processors 670 and 680 may be any type of processor and may exchange data via a point-to-point (PtP) interface 650 using point-to-point interface circuits 678 and 688, respectively. Processors 670 and 680 may each exchange data with a chipset 690 via individual point-to-point interfaces 652 and 654 using point-to-point interface circuits 676, 686, 694, and 698. Chipset 690 may also exchange data with a high-performance graphics circuit 638 via a high-performance graphics interface 639, using an interface circuit 692, which could be a PtP interface circuit. In alternative embodiments, any or all of the PtP links illustrated in FIG. 6 could be implemented as a multi-drop bus rather than a PtP link.

Chipset 690 may be in communication with a bus 620 via an interface circuit 696. Bus 620 may have one or more devices that communicate over it, such as a bus bridge 618 and I/O devices 616. Via a bus 610, bus bridge 618 may be in communication with other devices such as a keyboard/mouse 612 (or other input devices such as a touch screen, trackball, etc.), communication devices 626 (such as modems, network interface devices, or other types of communication devices that may communicate through a computer network 660), audio I/O devices 614, and/or a data storage device 628. Data storage device 628 may store code 630, which may be executed by processors 670 and/or 680. In alternative embodiments, any portions of the bus architectures could be implemented with one or more PtP links.

The computer system depicted in FIG. 6 is a schematic illustration of an embodiment of a computing system that may be utilized to implement various embodiments discussed herein. It will be appreciated that various components of the system depicted in FIG. 6 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 7:
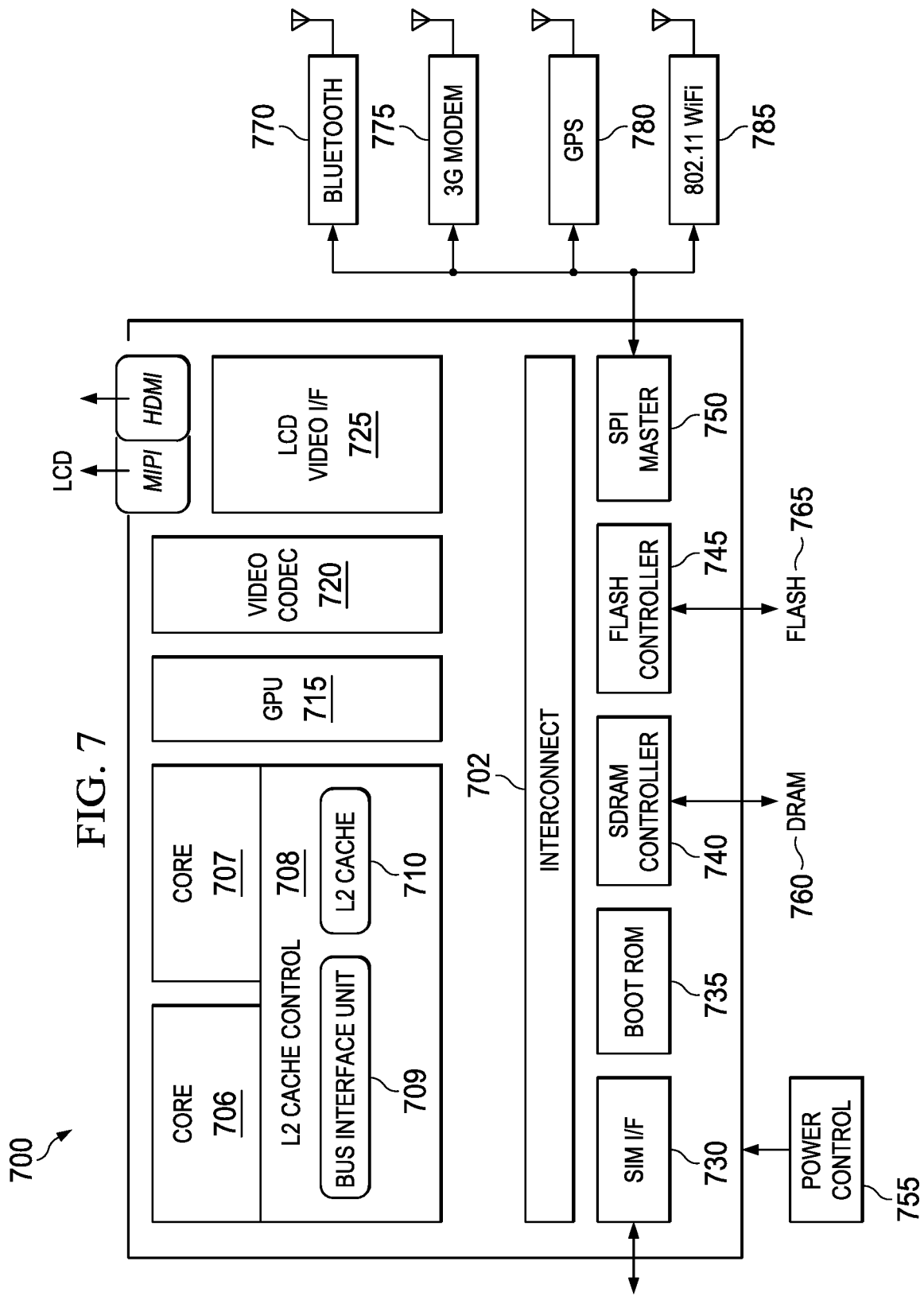
FIG. 7 is a simplified block diagram associated with an example ARM ecosystem system on chip (SOC) of the present disclosure.

Turning to FIG. 7, FIG. 7 is a simplified block diagram associated with an example ARM ecosystem SOC 700 of the present disclosure. At least one example implementation of the present disclosure can include the device pairing in a local network features discussed herein and an ARM component. For example, the example of FIG. 7 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 7, ARM ecosystem SOC 700 may include multiple cores 706-707, an L2 cache control 708, a bus interface unit 709, an L2 cache 710, a graphics processing unit (GPU) 715, an interconnect 702, a video codec 720, and a liquid crystal display (LCD) I/F 725, which may be associated with mobile industry processor interface (MIPI)/ high-definition multimedia interface (HDMI) links that couple to an LCD.

ARM ecosystem SOC 700 may also include a subscriber identity module (SIM) I/F 730, a boot read-only memory (ROM) 735, a synchronous dynamic random access memory (SDRAM) controller 740, a flash controller 745, a serial peripheral interface (SPI) master 750, a suitable power control 755, a dynamic RAM (DRAM) 760, and flash 765. In addition, one or more embodiments include one or more communication capabilities, interfaces, and features such as instances of Bluetooth™ 770, a 3G modem 775, a global positioning system (GPS) 780, and an 802.11 Wi-Fi 785.

In operation, the example of FIG. 7 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 8:
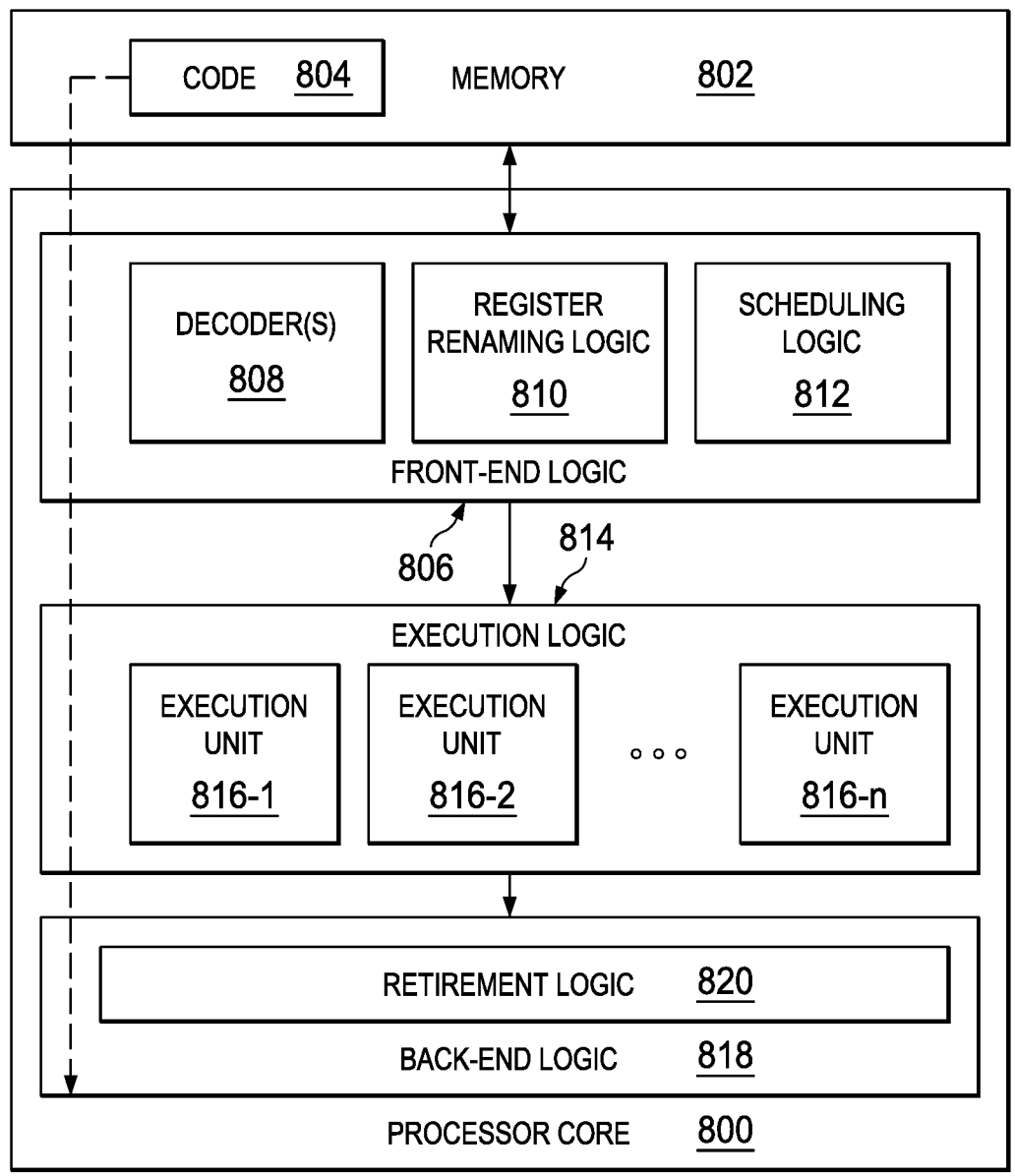
FIG. 8 is a block diagram illustrating an example processor core in accordance with an embodiment.

FIG. 8 illustrates a processor core 800 according to an embodiment. Processor core 800 may be the core for any type of processor, such as a micro-processor, an embedded processor, a digital signal processor (DSP), a network processor, or other device to execute code. Although only one processor core 800 is illustrated in FIG. 8, a processor may alternatively include more than one of the processor core 800 illustrated in FIG. 8. For example, processor core 800 represents one example embodiment of processors cores 674a, 674b, 684a, and 684b shown and described with reference to processors 670 and 680 of FIG. 6. Processor core 800 may be a single-threaded core or, for at least one embodiment, processor core 800 may be multithreaded in that it may include more than one hardware thread context (or "logical processor") per core.

FIG. 8 also illustrates a memory 802 coupled to processor core 800 in accordance with an embodiment. Memory 802 may be any of a wide variety of memories (including various layers of memory hierarchy) as are known or otherwise available to those of skill in the art. Memory 802 may include code 804, which may be one or more instructions, to be executed by processor core 800. Processor core 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor core 800 can also include execution logic 814 having a set of execution units 816-1 through 816-N. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor core 800 allows out of order execution but requires in order retirement of instructions. Retirement logic 820 may take a variety of known forms (e.g., re-order buffers or the like). In this manner, processor core 800 is transformed during execution of code 804, at least in terms of the output generated by the decoder, hardware registers and tables utilized by register renaming logic 810, and any registers (not shown) modified by execution logic 814.

Although not illustrated in FIG. 8, a processor may include other elements on a chip with processor core 800, at least some of which were shown and described herein with reference to FIG. 6. For example, as shown in FIG. 6, a processor may include memory control logic along with processor core 800. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication systems 100a and 100b and their teachings are readily scalable and can accommodate a large number of components, as well as more complicated/sophisticated arrangements and configurations. Accordingly, the examples provided should not limit the scope or inhibit the broad teachings of communication system 100 and as potentially applied to a myriad of other architectures.

It is also important to note that the operations in the preceding flow diagrams (i.e., FIGS. 4 and 5) illustrate only some of the possible correlating scenarios and patterns that may be executed by, or within, communication systems 100a and 100b. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems 100a and 100b in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication systems 100a and 100b have been illustrated with reference to particular elements and operations that facilitate the communication process, these elements and operations may be replaced by any suitable architecture, protocols, and/or processes that achieve the intended functionality of communication systems 100a and 100b.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable medium having one or more instructions that when executed by at least one processor cause the at least one processor to receive registration data for a local network device, receive registration data for an electronic device, receive a request to pair the local network device and the electronic device, where the request include a pairing code; and allow the pairing if the registration data for the local network device, the registration data for the electronic device, and the pairing code satisfies predetermined conditions.

In Example C2, the subject matter of Example C1 can optionally include where the registration data for the local network device and the registration data for the electronic device includes temporal data.

In Example C3, the subject matter of any one of Examples C1-C2 can optionally include where the instructions, when executed by the at least one processor, further cause the at least one processor to send a pairing code to the local network device and receive the pairing code from the electronic device.

In Example C4, the subject matter of any one of Examples C1-C3 can optionally include where the electronic device requested and received the pairing code from the local network device.

In Example C5, the subject matter of any one of Examples C1-C4 can optionally include where the pairing code is encrypted before being sent from the local network device.

In Example C6, the subject matter of any one of Examples C1-C5 can optionally include where the temporal pairing code is not persistently stored on the local network device or on the electronic device.

In Example C7, the subject matter of any one of Example C1-C6 can optionally include where the registration data for the local network device and the registration data for the electronic device includes local network identification.

In Example C8, the subject matter of any one of Examples C1-C7 can optionally include where the pairing is not allowed if the local network identification in the registration data for the local network device and in the registration data for the electronic device does not match.

In Example A1, an apparatus can include a pairing module, where the pairing module is configured to receive registration data for a local network device, receive registration data for an electronic device, receive a request to pair the local network device and the electronic device where the request include a pairing code, and allow the pairing if the registration data for the local network device, the registration data for the electronic device, and the pairing code satisfies predetermined conditions.

In Example, A2, the subject matter of Example A1 can optionally include where the registration data for the local network device and the registration data for the electronic device includes temporal data.

In Example A3, the subject matter of any one of Examples A1-A2 can optionally include where the pairing module is further configured to send the pairing code to the local network device and receive the pairing code from the electronic device.

In Example A4, the subject matter of any one of Examples A1-A3 can optionally include where the electronic device requested and received the pairing code from the local network device.

In Example A5, the subject matter of any one of Examples A1-A4 can optionally include where the temporal pairing code is not persistently stored on the local network device or on the electronic device.

In Example A6, the subject matter of any one of Examples A1-A5 can optionally include where registration data for the local network device and the registration data for the electronic device includes local network identification.

In Example A7, the subject matter of any one of Examples A1-A6 can optionally include where the pairing is not allowed if the local network identification in the registration data for the local network device and in the registration data for the electronic device does not match.

Example M1 is a method including receiving registration data for a local network device, receiving registration data for an electronic device, receiving a request to pair the local network device and the electronic device, where the request includes a pairing code, and allowing the pairing if the registration data for the local network device, the registration data for the electronic device, and the pairing code satisfies predetermined conditions.

In Example M2, the subject matter of Example M1 can optionally include where the registration data for the local network device and the registration data for the electronic device includes temporal data.

In Example M3, the subject matter of any one of the Examples M1-M2 can optionally include sending the pairing code to the local network device and receiving the pairing code from the electronic device, wherein the electronic device requested and received the pairing code from the local network device.

In Example M4, the subject matter of any one of the Examples M1-M3 can optionally include where the pairing code is encrypted before being sent to the local network device.

In Example M5, the subject matter of any one of the Examples M1-M4 can optionally include where the pairing code is not persistently stored on the local network device or on the electronic device.

In Example M6, the subject matter of any one of the Examples M1-M5 can optionally include where registration data for the local network device and the registration data for the electronic device includes local network identification.

In Example M7, the subject matter of any one of the Examples M1-M6 can optionally include where the pairing is not allowed if the local network identification in the registration data for the local network device and in the registration data for the electronic device does not match.

Example S1 is a system for pairing devices in a local network, the system including a pairing module, where the pairing module is configured to receive registration data for a local network device, receive registration data for an electronic device, receive a request to pair the local network device and the electronic device, where the request includes a pairing code, and allow the pairing if the registration data for the local network device, the registration data for the electronic device, and the pairing code satisfies predetermined conditions.

In Example S2, the subject matter of Example S1 can optionally include where the registration data for the local network device and the registration data for the electronic device includes temporal data.

In Example S3, the subject matter of any of the Examples S1-S2 can optionally include where the pairing module is further configured to send the pairing code to the local network device and receive the pairing code from the electronic device, wherein the electronic device requested and received the pairing code from the local network device.

Example X1 is a machine-readable storage medium including machine-readable instructions to implement a method or realize an apparatus as in any one of the Examples A1-A7, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory computer-readable medium comprising one or more instructions that when executed by a processor, cause the processor to:
   receive, from an electronic device, a request to pair the electronic device and a local network device;
   determine whether the local network device and the electronic device are present in the same local network at the same time by determining whether:
   (a) an SSID or BSSID for the local network of the electronic device matches an SSID or BSSID respectively for the local network of the local network device; and
   (b) a temporal pairing code (TPC) is not expired, wherein the electronic device requested and received the TPC encrypted from the local network device; and
   based on a determination that the local network device and the electronic device are present in the same local network at the same time because the SSIDs or BSSIDs match and that the TPC is not expired, allow the pairing.

2. The at least one non-transitory computer-readable medium of claim 1, further comprising one or more instructions that when executed by a processor, cause the processor to:
   transmit, to the local network device, the TPC; and
   receive, from the electronic device, the TPC.

3. The at least one non-transitory computer-readable medium of claim 1, wherein the TPC is not persistently stored on the local network device or on the electronic device.

4. The at least one non-transitory computer-readable medium of claim 1, wherein the pairing is not allowed based on a determination that the SSIDs or BSSIDs do not match, or based on a determination that the TPC is expired.

5. An apparatus, comprising:
   a memory element operable to store instructions; and
   a processor operable to execute the instructions, such that the apparatus is configured to:
   receive, from an electronic device, a request to pair the electronic device and a local network device;
   determine whether the local network device and the electronic device are present in the same local network at the same time by determining whether:
   (a) an SSID or BSSID for the local network of the electronic device matches an SSID or BSSID respectively for the local network of the local network device; and
   (b) a temporal pairing code (TPC) is not expired, wherein the electronic device requested and received the TPC encrypted from the local network device; and
   based on a determination that the local network device and the electronic device are present in the same local network at the same time because the SSIDs or BSSIDs match and that the TPC is not expired, allow the pairing.

6. The apparatus of claim 5, further configured to:
   transmit, to the local network device, the TPC; and
   receive, from the electronic device, the TPC.

7. The apparatus of claim 5, wherein the TPC is not persistently stored on the local network device or on the electronic device.

8. The apparatus of claim 5, wherein the pairing is not allowed based on a determination that the SSIDs or BSSIDs do not match, or based on a determination that the TPC is expired.

9. A method comprising:
   receiving, from an electronic device, a request to pair the electronic device and a local network device;
   determining whether the local network device and the electronic device are present in the same local network at the same time by determining whether:
   (a) an SSID or BSSID for the local network of the electronic device matches an SSID or BSSID respectively for the local network of the local network device; and
   (b) a temporal pairing code (TPC) is not expired, wherein the electronic device requested and received the TPC encrypted from the local network device; and
   based on a determination that the local network device and the electronic device are present in the same local network at the same time because the SSIDS or BSSIDs match and that the TPC is not expired, allowing the pairing.

10. The method of claim 9, further comprising:
    transmitting, to the local network device, the TPC; and
    receiving, from the electronic device, the TPC.

11. The method of claim 9, wherein the TPC is not persistently stored on the local network device or on the electronic device.

12. The method of claim 9 wherein the pairing is not allowed based on a determination that the SSIDs or BSSIDs do not match, or based on a determination that the TPC is expired.

13. A system for pairing devices in a local network, the system comprising:
    memory; and
    a hardware processor configured to:
    receive, from an electronic device, a request to pair the electronic device and a local network device;
    determine whether the local network device and the electronic device are present in the same local network at the same time by determining whether:
    (a) an SSID or BSSID for the local network of the electronic device matches an SSID or BSSID respectively for the local network of the local network device; and
    (b) a temporal pairing code (TPC) is not expired, wherein the electronic device requested and received the TPC encrypted from the local network device; and based on a determination that the local network device and the electronic device are present in the same local network at the same time by determining whether the SSIDs or BSSIDs match and that the TPC is not expired, allow the pairing.

14. The system of claim 13, further comprising:
transmit, to the local network device, the TPC; and
receive, from the electronic device, the TPC.

15. The system of claim 13, wherein the TPC is not persistently stored on the local network device or on the electronic device.

16. The system of claim 13, wherein the pairing is not allowed based on a determination that the SSIDs or BSSIDs do not match, or based on a determination that the TPC is expired.

* * * * *